US007796767B2

(12) United States Patent
Ura et al.

(10) Patent No.: US 7,796,767 B2
(45) Date of Patent: Sep. 14, 2010

(54) HOWLING DETECTION METHOD, DEVICE, AND ACOUSTIC DEVICE USING THE SAME

(75) Inventors: Takefumi Ura, Kanagawa-ken (JP); Yoshiyuki Yoshizumi, Kanagawa-ken (JP)

(73) Assignee: Panasonic Corporation, Osaka (JP)

( * ) Notice: Subject to any disclaimer, the term of this patent is extended or adjusted under 35 U.S.C. 154(b) by 135 days.

(21) Appl. No.: 10/589,843

(22) PCT Filed: Feb. 16, 2005

(86) PCT No.: PCT/JP2005/002303

§ 371 (c)(1), (2), (4) Date: May 31, 2007

(87) PCT Pub. No.: WO2005/081577

PCT Pub. Date: Sep. 1, 2005

(65) Prior Publication Data

US 2007/0280487 A1 Dec. 6, 2007

(30) Foreign Application Priority Data

Feb. 20, 2004 (JP) ............................ 2004-044026

(51) Int. Cl.
*H04B 15/00* (2006.01)
*H04B 3/20* (2006.01)
*H04M 9/08* (2006.01)

(52) U.S. Cl. ....................... 381/93; 381/71.1; 381/94.1; 381/94.3; 381/66; 379/406.08; 379/406.01; 379/406.06

(58) Field of Classification Search .................. 381/93, 381/71.1–71.14, 98, 99, 66, 103, 94.1, 94.3; 379/406.01–406.08
See application file for complete search history.

(56) References Cited

U.S. PATENT DOCUMENTS 5,677,987 A * 10/1997 Seki et al. .................. 704/226

FOREIGN PATENT DOCUMENTS

| | | | |
|---|---|---|---|
| EP | 1278396 A2 * | 1/2003 |
| JP | 05188977 A * | 7/1993 |
| JP | 07-058674 | 3/1995 |
| JP | 07-147700 | 6/1995 |
| JP | 08-149593 | 6/1996 |

(Continued)

OTHER PUBLICATIONS

International Search Report for Application No. PCT/JP2005/002303 dated May 31, 2005.

*Primary Examiner*—Devona E Faulk
(74) *Attorney, Agent, or Firm*—RatnerPrestia

(57) ABSTRACT

A howling detector is provided which can discriminate between howling and a signal having a strong narrow-band component, thereby detecting howling with higher accuracy. The howling analyzer includes a frequency analyzing section for analyzing a frequency of a time signal, a level calculating section for calculating a level of a signal output from the frequency analyzing section, a howling detecting section for deciding whether howling occurs or not by analyzing the level having been calculated by the level calculating section, a periodic signal detecting section for deciding whether or not time progression of the level having been calculated by the level calculating section has periodicity, and a howling deciding section for finally deciding whether howling occurs or not based on decision results of the howling detecting section and the periodic signal detecting section.

8 Claims, 10 Drawing Sheets

FOREIGN PATENT DOCUMENTS

| | | |
|---|---|---|
| JP | 08-223684 | 8/1996 |
| JP | 2003-259480 | 9/2003 |
| JP | 2004-032387 | 1/2004 |
| JP | 2004-200883 | 7/2004 |

* cited by examiner

HOWLING DETECTION METHOD, DEVICE, AND ACOUSTIC DEVICE USING THE SAME

THIS APPLICATION IS A U.S. NATIONAL PHASE APPLICATION OF PCT INTERNATIONAL APPLICATION PCT/JP05/002303.

FIELD OF THE INVENTION

The present invention relates to a howling detector for automatically detecting howling caused by acoustic coupling between speakers and a microphone in an acoustic device including the microphone and the speakers, and a howling detection method.

DESCRIPTION OF THE RELATED ART

In an acoustic device where a microphone and speakers are combined, sound reproduced from the speakers enters the microphone and forms a feedback loop, so that howling may occur.

A conventional howling detector is known which analyzes the frequency component of an input signal and detects, as a howling occurrence band, a band reaching the peak level (for example, Patent document 1). Referring to FIG. 1, a conventional howling detector will be discussed below.

FIG. 1 is a block diagram showing a structural example of the conventional howling detector. In FIG. 1, reference numeral 1001 denotes a signal input terminal connected to a microphone or the like, reference numeral 1002 denotes a band dividing section for dividing a time signal having been input to the signal input terminal into plural frequency bands, reference numeral 1003 denotes a level calculating section for calculating the absolute value of the time signal having been divided into the plural frequency bands in the band dividing section, reference numeral 1004 denotes a peak value calculating section for calculating the peak value of the absolute value for each of the frequency bands, reference numeral 1005 denotes a howling deciding section for deciding whether howling occurs or not, and reference numeral 1006 denotes a signal output terminal for outputting a howling detection result.

The following will describe the operations of the conventional howling detector. A time signal input to the signal input terminal 1001 is divided into plural frequency bands by the band dividing section 1002. The level calculating section 1003 calculates the absolute value of each frequency band signal. This processing corresponds to the measurement of the frequency characteristic of the input signal which changes all the time. The peak value calculating section 1004 calculates the peak value of the absolute values having been output from the level calculating section 1003. The howling deciding section 1005 decides the presence or absence of howling by analyzing each peak value, and outputs a decision result to the signal output terminal 1006.

As described above, in the conventional howling detector, howling can be automatically detected by noting the characteristic of howling reaching its peak on the frequency axis.

Patent Reference 1: Japanese Patent Laid-Open No. 8-149593

In the conventional howling detector, however, howling is detected with reference to the peak value of the absolute values of frequency band signals. Since the accuracy of detecting howling depends on the level of an input signal, when inputting a signal having a strong narrow-band component such as a siren and a ringer tone of a telephone, erroneous detection of howling may occur.

SUMMARY OF THE INVENTION

The present invention is designed to solve the conventional problem. It is desirable to provide a howling detector, an acoustic device including the same, and a howling detection method whereby howling can be detected with higher accuracy than the related art.

In order to solve the conventional problem, the howling detector of the present invention includes a frequency analyzing section for analyzing the frequency of a time signal, a level calculating section for calculating the level of a signal output from the frequency analyzing section, a howling detecting section for analyzing the level having been calculated by the level calculating section and deciding whether howling occurs or not, a periodic signal detecting section for deciding whether or not the time progression of the level having been calculated by the level calculating section has periodicity, and a howling deciding section for finally deciding whether howling occurs or not based on the decision results of the howling detecting section and the periodic signal detecting section.

With this configuration, the howling detector of the present invention can reduce erroneous detection of howling by discriminating whether a frequency band signal having reached the peak level is howling or a signal having a strong narrow-band component, so that howling can be detected with higher accuracy than the related art.

According to the howling detector of the present invention, the howling detecting section includes an average level calculating section for calculating a mean value of levels of all frequency bands, a level ratio calculating section for calculating a level ratio which is a magnification difference between the level calculated by the level calculating section and an average level calculated by the average level calculating section, a level ratio analyzing section for analyzing the level ratio having been calculated by the level ratio calculating section, and a level ratio deciding section for deciding whether howling occurs or not based on an analysis result of the level ratio analyzing section.

With this configuration, the howling detector of the present invention refers to the level ratio which is a magnification difference between the average level of all the frequency bands and the level of each frequency band, so that howling can be stably detected even in the presence of ground noise.

According to the howling detector of the present invention, the periodic signal detecting section includes an envelope calculating section for calculating the envelope of the level having been calculated by the level calculating section, a signal condition deciding section for deciding which one of predetermined signal conditions corresponds to the envelope having been calculated by the envelope calculating section, and a periodicity deciding section for deciding, based on a decision result of the signal deciding section, whether the time progression of the envelope has periodicity or not.

With this configuration, the howling detector of the present invention decides whether the time progression of the level of each frequency band has periodicity or not and reduces erroneous detection of howling by discriminating between howling and a signal having a strong narrow-band component, so that howling can be detected with higher accuracy than the related art.

According to the howling detector of the present invention, the signal condition deciding section decides which at least one or more signal conditions of the rising edge (or attack) of a signal, a signal interval, and a non-signal interval correspond to the time progression of the envelope having been calculated by the envelope calculating section.

With this configuration, the howling detector of the present invention decides whether the time progression of the level of each frequency band has periodicity or not by analyzing the rough shape of the time progression of the level for each frequency band, and reduces erroneous detection of howling by discriminating between howling and a signal having a strong narrow-band component, so that howling can be detected with higher accuracy than the related art.

According to the howling detector of the present invention, the periodicity deciding section compares at least one or more of signal interval lengths and non-signal interval lengths between the latest time period and a past time period in the time progression of the envelope having been calculated by the envelope calculating section.

With this configuration, the howling detector of the present invention decides whether or not the time progression of the level has periodicity in each frequency band and reduces erroneous detection of howling by discriminating between howling and a signal having a strong narrow-band component, so that howling can be detected with higher accuracy than the related art.

According to the howling detector of the present invention, the level calculating section, the howling detecting section, the periodic signal detecting section, and the howling deciding section perform processing only on some frequency bands.

With this configuration, the howling detector of the present invention performs processing only on frequency bands where howling is expected to occur, so that an arithmetic quantity can be reduced.

The acoustic device of the present invention includes the howling detector and a howling suppressor.

With this configuration, the acoustic device of the present invention can detect and suppress howling with higher accuracy than the related art. It is thus possible to reduce harsh sound and improve the gain of an amplifier having been limited by howling.

A howling detection method according to the present invention includes a frequency analysis step of analyzing the frequency of a time signal, a level calculation step of calculating the level of a signal output from the frequency analysis step, a howling detection step of analyzing the level having been calculated in the level calculation step and deciding whether howling occurs or not, a periodic signal detection step of deciding whether or not the time progression of the level having been calculated in the level calculation step has periodicity, and a howling decision step of finally deciding whether howling occurs or not based on the decision results of the howling detection step and the periodic signal detection step.

With this configuration, the howling detection method according to the present invention can reduce erroneous detection of howling by discriminating whether a frequency band signal having reached the peak level is howling or a signal having a strong narrow-band component, so that howling can be detected with higher accuracy than the related art.

As described above, the present invention can provide a howling detector, an acoustic device including the same, and a howling detection method whereby erroneous detection of howling can be reduced by discriminating between howling and a signal having a strong narrow-band component, so that howling can be detected with higher accuracy than the related art.

The object and advantage of the present invention will be more apparent from the embodiments described with reference to the accompanying drawings.

DETAILED DESCRIPTION OF THE PREFERRED EMBODIMENTS

The following will describe embodiments of the present invention in accordance with the accompanying drawings.

Embodiment 1

Figure 1:
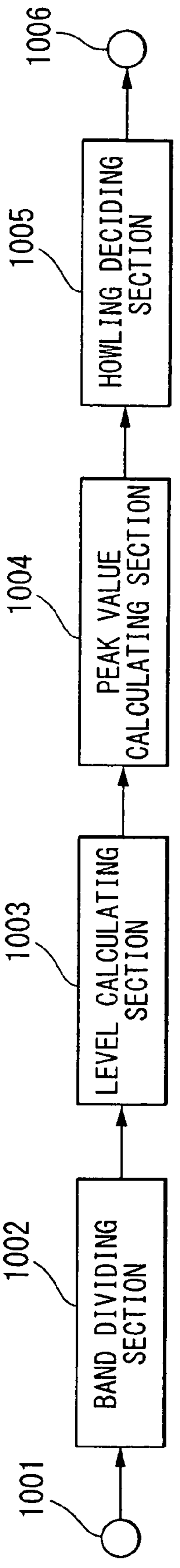
FIG. 1 is a block diagram showing a structural example of a conventional howling detector.
Figure 2:
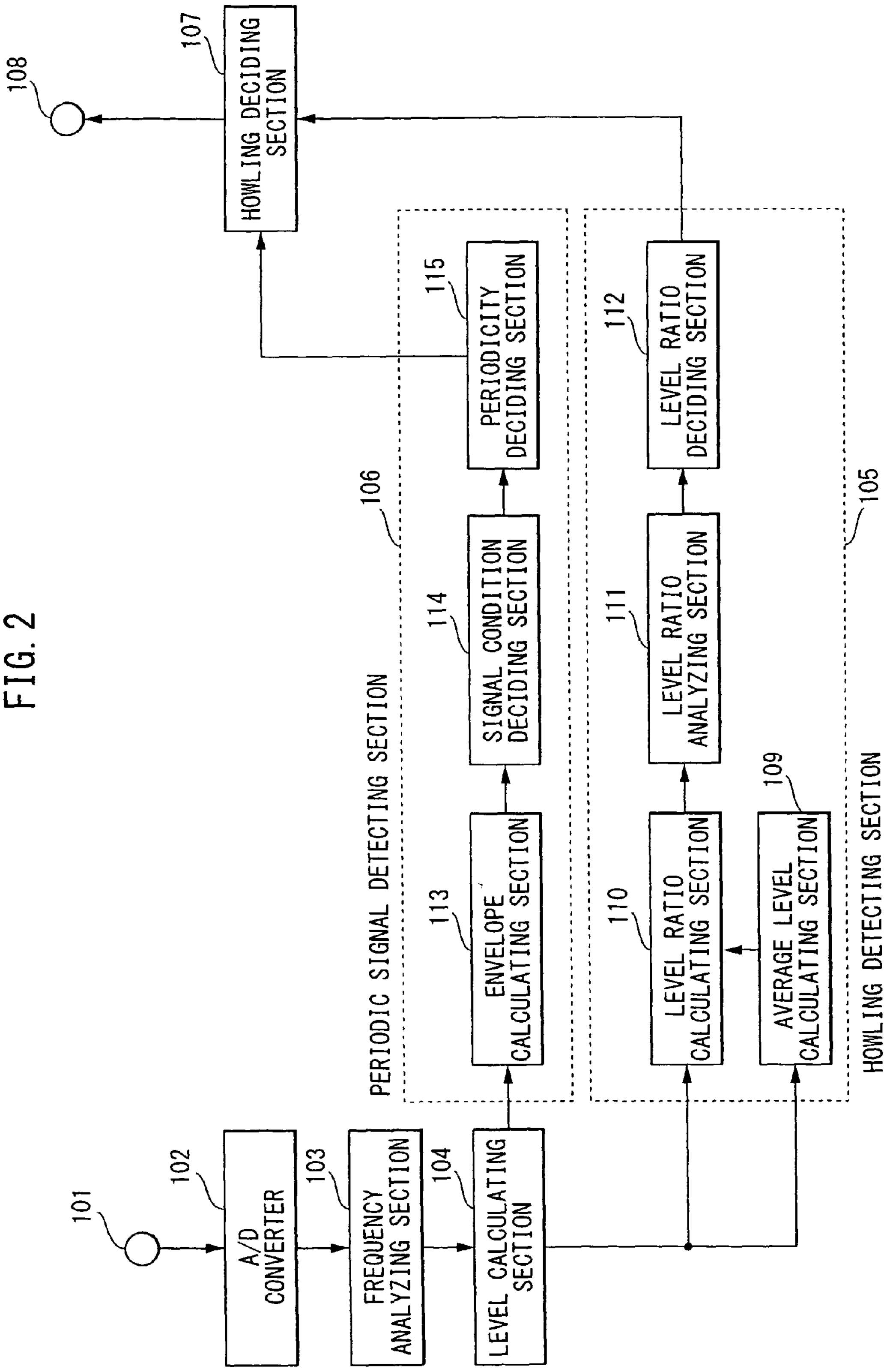
FIG. 2 is a block diagram showing the configuration of a howling detector according to Embodiment 1 of the present invention.

FIG. 2 is a block diagram showing a howling detector according to Embodiment 1 of the present invention. In FIG. 2, the howling detector of the present embodiment includes a signal input terminal 101 to which a signal is input from a microphone or the like (not shown), an AD converter 102 for converting, from an analog signal to a digital signal, the signal having been input to the signal input terminal 101, a frequency analyzing section 103 for analyzing the frequency of a time signal output from the AD converter 102, a level calculating section 104 for calculating the level of the signal output from the frequency analyzing section 103, a howling detecting section 105 for deciding whether howling occurs or not by analyzing the level having been calculated by the level calculating section 104, a periodic signal detecting section 106 for deciding whether or not the time progression of the level having been calculated by the level calculating section 104 has periodicity, a howling deciding section 107 for finally deciding whether howling occurs or not based on the decision results of the howling detecting section 105 and the periodic signal detecting section 106, and a signal output terminal 108 for outputting the decision result of the howling deciding section 107.

The howling detecting section 105 includes an average level calculating section 109 for calculating the mean value of the levels of all the frequency bands, the levels having been calculated by the level calculating section 104, a level ratio calculating section 110 for calculating a level ratio which is a magnification difference between the level calculated by the level calculating section 104 and an average level calculated by the average level calculating section 109, a level ratio analyzing section 111 for analyzing the level ratio having been calculated by the level ratio calculating section 110, and a level ratio deciding section 112 for deciding whether howling occurs or not based on the analysis result of the level ratio analyzing section 111.

The periodic signal detecting section 106 includes an envelope calculating section 113 for calculating the envelope of the level having been calculated by the level calculating section 104, a signal condition deciding section 114 for deciding which one of predetermined signal conditions corresponds to the envelope having been calculated by the envelope calculating section 113, and a periodicity deciding section 115 for deciding, based on the decision result of the signal deciding section 114, whether the time progression of the envelope has periodicity or not.

The following will describe the operations of the howling detector according to the present embodiment. In the following explanation, howling is detected at respective frequencies separately and in parallel.

A time signal input from a microphone or the like (not shown) to the signal input terminal 101 is converted from an analog signal to a digital signal by the AD converter 102. And then, the signal is input to the frequency analyzing section 103 and divided into plural frequency signals. The dividing method used in the frequency analyzing section 103 is time-frequency transform such as fast Fourier transform. In the level calculating section 104, a level is calculated for each of the plural frequencies having been output from the frequency analyzing section 103.

The following will discuss the operations of the howling detecting section 105. The average level calculating section 109 calculates a level mean value of all the frequency bands. The level ratio calculating section 110 calculates a level ratio which is a magnification difference between each frequency level value and the level mean value of all the frequency bands. The level ratio analyzing section 111 compares the level ratio with a predetermined first threshold value for detecting howling. When the level ratio at a certain frequency exceeds the first threshold value for detecting howling, a howling detecting counter is incremented. When the howling detecting counter exceeds a predetermined second threshold value for detecting howling, the level ratio deciding section 112 decides that howling occurs and outputs the decision result to the howling deciding section 107. When the incremented counter for detecting howling does not satisfy a howling decision condition in the level ratio analyzing section 111, the howling detecting counter is reset.

Figure 3:
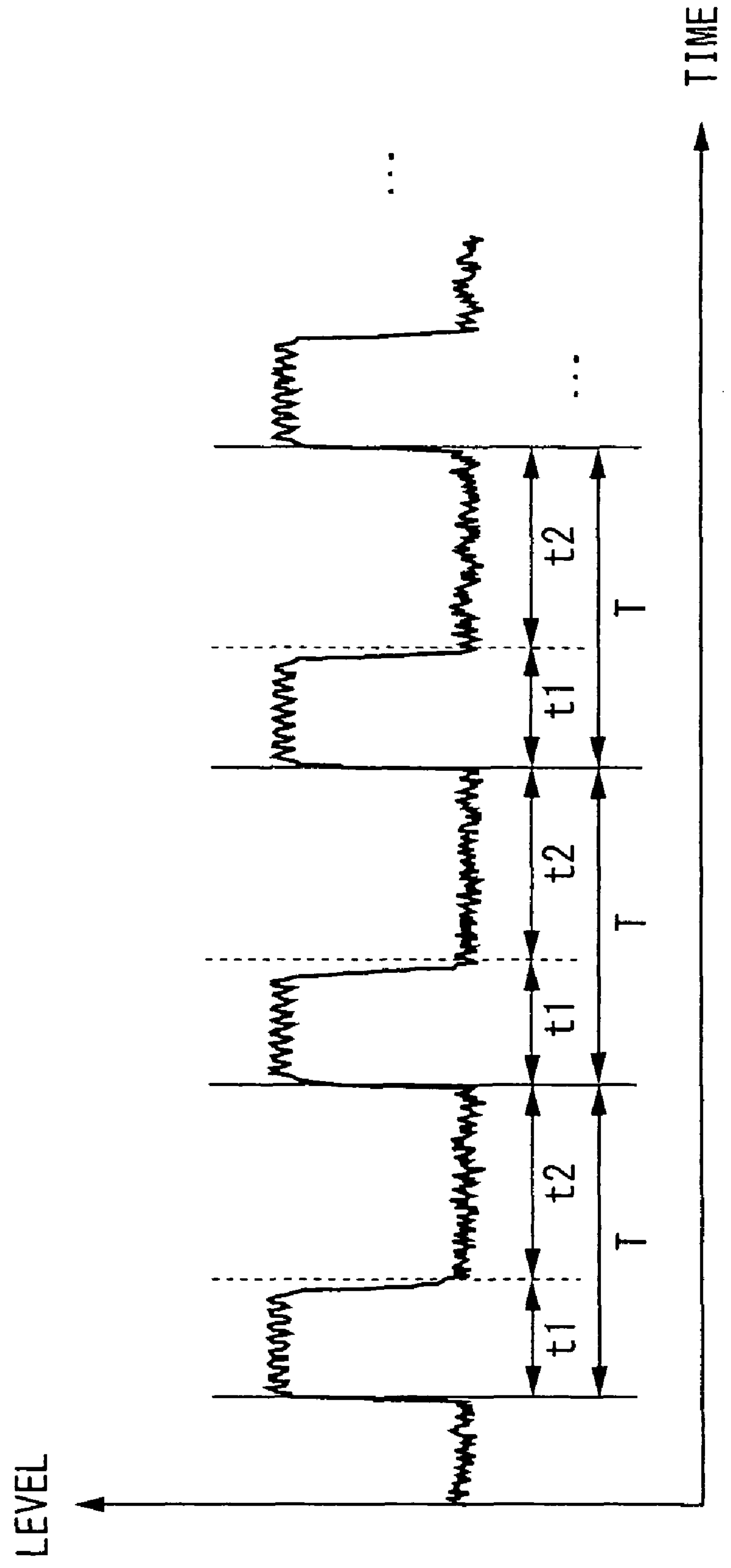
FIG. 3 is a waveform chart showing an example of the time transition of the level of a narrow-band signal according to Embodiment 1 of the present invention.

The following will discuss the operations of the periodic signal detecting section 106. FIG. 3 is a waveform chart showing the time progression of the level of a frequency band for a ringer tone of a telephone as an example of a signal having a strong narrow-band component. The howling level increases with time, whereas the level of a narrow-band signal of, for example, a siren or a ringer tone of a telephone changes almost like a rectangular wave and periodically in the time direction as shown in FIG. 3. The periodic signal detecting section 106 detects such a narrow-band signal. As shown in FIG. 3, an interval between the rising edge and the rising edge of the signal in the time direction is represented as period T of the time progression of the level, a signal interval is represented as t1, and a non-signal interval is represented as t2. Referring to FIG. 3, the following will discuss the operations of the periodic signal detecting section 106.

The envelope calculating section 113 stores, in a buffer (not shown), the frequency level values of a currently processed frame and Na frames before the current frame. The frequency level values are output from the level calculating section 104. The envelope calculating section 113 calculates the maximum value of the frequency levels of the currently processed frame and the Na frames before the current frame, so that the envelope of the time progression of the level is calculated. The signal condition deciding section 114 decides which one of predetermined three-stage signal conditions of (Step 1) the rising edge of a signal, (Step 2) signal interval, and (Step 3) non-signal interval corresponds to the envelope having been calculated by the envelope calculating section 113. The signal conditions to be decided alternately change in this order every time the signal condition is detected, which corresponds to an analysis of the rough shape of the time progression of the level. The following will discuss the decision of the three-stage signal conditions.

(Step 1) Detection of the Rising Edge of a Signal

The detection of the rising edge of a signal includes two stages of (1) the detection of the rising edge and (2) the detection of a transition to a signal interval after the detection of the rising edge.

Figure 4:
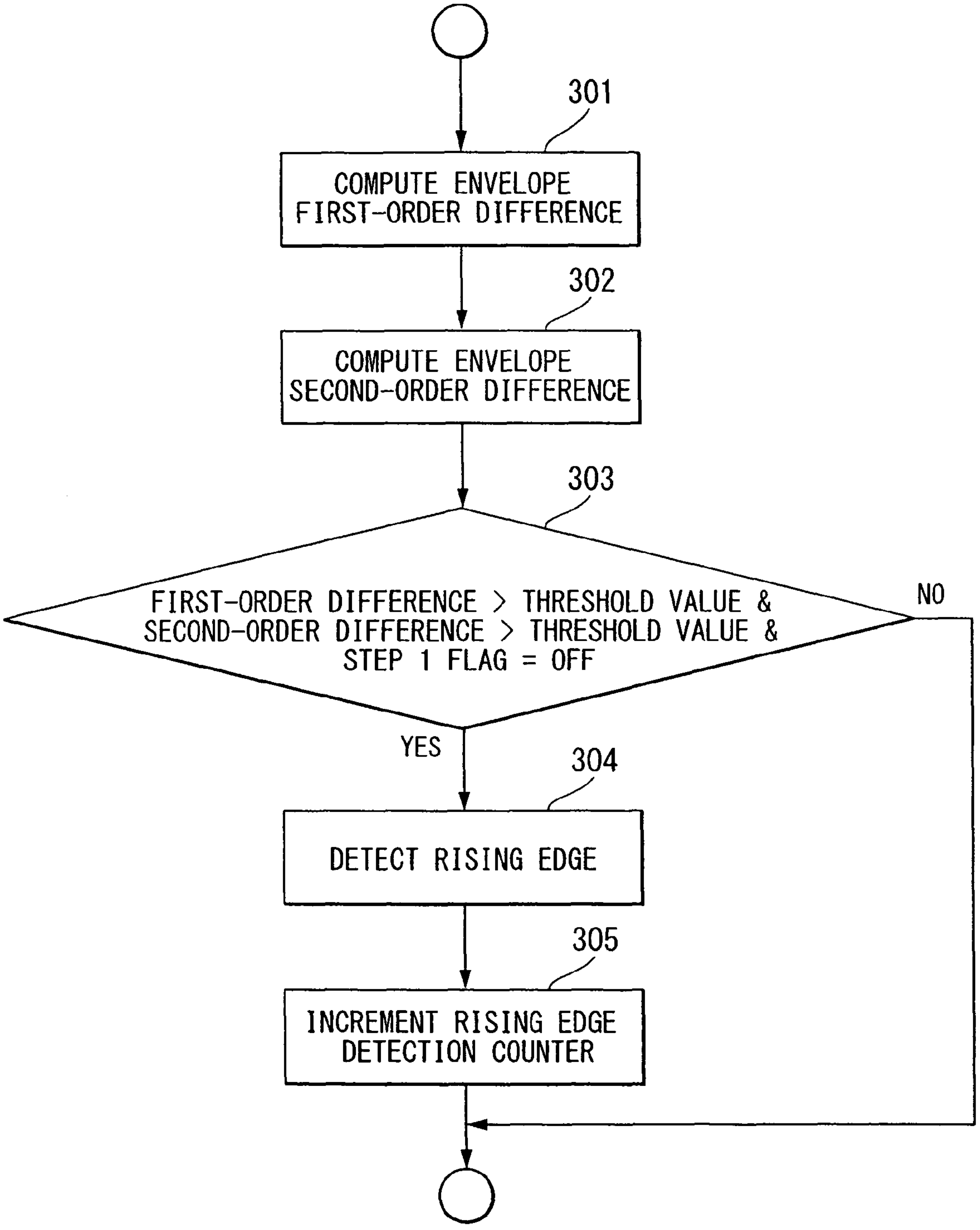
FIG. 4 is a flowchart showing operations for detecting the rising edge of a signal in a signal condition deciding section according to Embodiment 1 of the present invention.

First, the operations of (1) the detection of the rising edge will be discussed below. FIG. 4 is a flowchart showing the operations of (1) the detection of the rising edge. Reference numeral 301 denotes an envelope first-order difference computing unit, reference numeral 302 denotes an envelope second-order difference computing unit, reference numeral 303 denotes a difference comparator, reference numeral 304 denotes a rising edge detection/decision unit, and reference numeral 305 denotes a rising edge detection counter updater. The envelope first-order difference computing unit 301 calculates a difference between the envelope of the current frame and an envelope obtained Nb frames ago, so that the first-order difference of the envelope is calculated. The envelope second-order difference computing unit 302 calculates a difference between the first-order difference of the current frame and the first-order difference of the previous frame, so that the second-order difference of the envelope is calculated. The difference comparator 303 compares the first-order difference with a first threshold value for detecting the rising edge and compares the second-order difference with a predetermined second threshold value for detecting the rising edge. In a state in which Step 1 flag is turned off, when the first-order difference exceeds the first threshold value for detecting the rising edge and the second-order difference exceeds the second threshold value for detecting the rising edge, the rising edge detection/decision unit 304 decides that the rising edge of the signal is detected and turns on Step 1 flag. At the same time, the rising edge detection counter updater 305 increments a rising edge detection counter.

Figure 5:
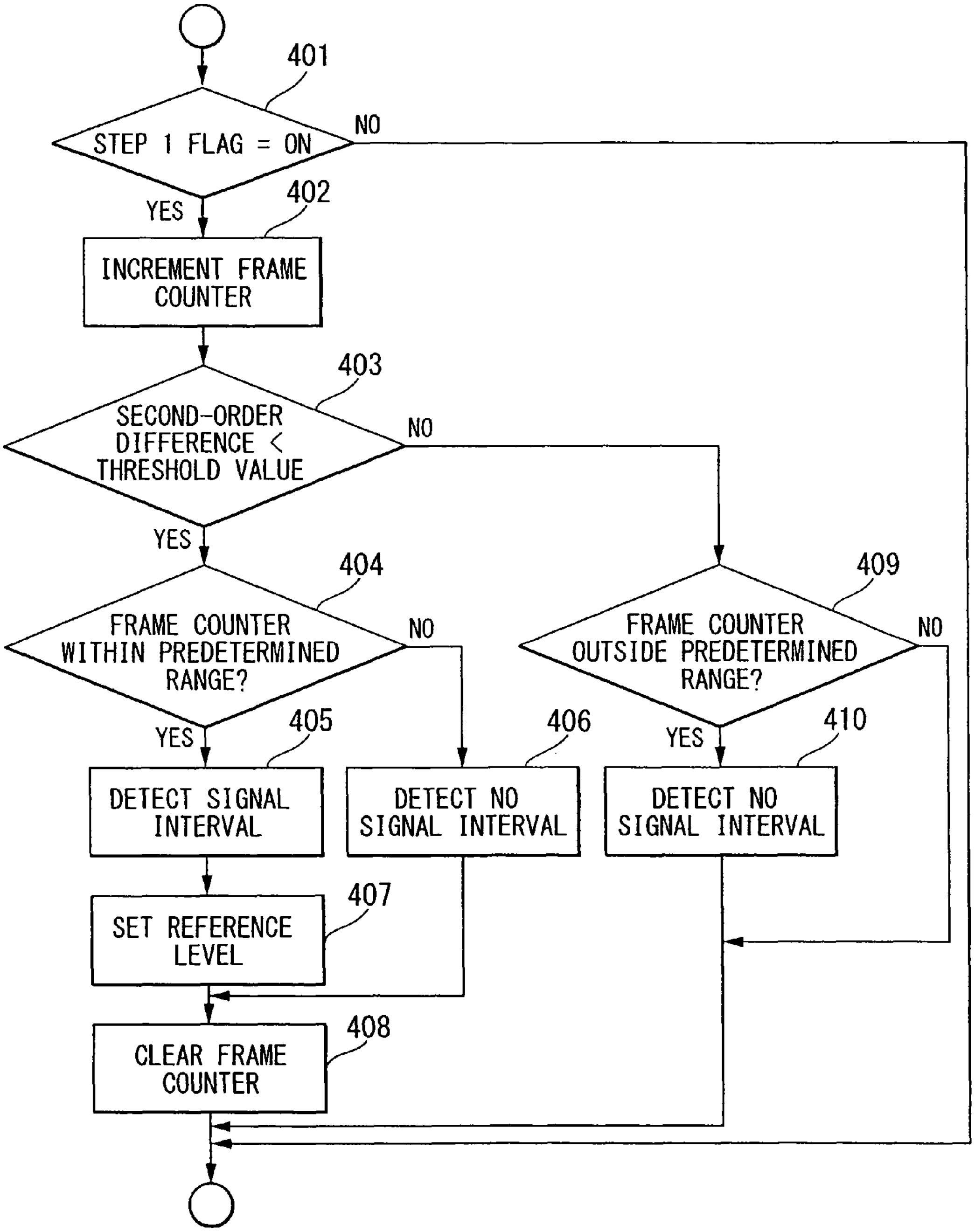
FIG. 5 is a flowchart showing operations for detecting a transition to a signal interval in the signal condition deciding section according to Embodiment 1 of the present invention.

The following will discuss the operations of (2) the detection of a transition to a signal interval after the detection of the rising edge. FIG. 5 is a flowchart showing the operations of (2) the detection of a transition to a signal interval. Reference numeral 401 denotes a signal condition decision unit, reference numeral 402 denotes a frame counter updater, reference numeral 403 denotes a difference comparator, reference numeral 404 denotes a first frame counter comparator, reference numeral 405 a first signal interval detection/decision unit, reference numeral 406 denotes a second signal interval detection/decision unit, reference numeral 407 denotes a reference level setting unit, reference numeral 408 denotes a frame counter resetter, reference numeral 409 denotes a second frame counter comparator, and reference numeral 410 denotes a third signal interval detection/decision unit. After the rising edge detection/decision unit 304 decides the rising edge of a signal in (1) the detection of the rising edge, it is decided whether the time progression of the level is in a steady state, that is, whether the envelope makes a transition to a signal interval as shown in FIG. 3. This processing corresponds to (2) the detection of a transition to a signal interval.

The signal condition decision unit 401 decides whether Step 1 flag is turned on or off. When Step 1 flag is turned on, the frame counter updater 402 starts incrementing the frame counter. The difference comparator 403 compares the second-order difference of the envelope and a threshold value for detecting a transition to a predetermined signal interval, the second order difference having been calculated by the envelope second-order difference computing unit 302. The first frame counter comparator 404 decides whether the frame counter is within a predetermined range when the second-order difference falls below the threshold value for detecting a transition to a signal interval. As a result of the decision of the first frame counter comparator 404, when the frame counter is within the predetermined range, it is decided that the envelope is in a steady state, that is, the envelope makes a transition to a signal interval, the first signal interval detection/decision unit 405 turns off Step 1 flag and turns on Step 1 flag, and the reference level setting unit 407 sets the level of the envelope at that time as the reference level used in the detection of a signal interval (to be described later). When the frame counter is outside the predetermined range, it is decided that the envelope has not made a transition to a signal interval, and the second signal interval detection/decision unit 406 turns off Step 1 flag and resets the rising edge detection counter. Further, the frame counter resetter 408 resets the frame counter. When the frame counter falls outside the predetermined range before the second-order difference falls below the threshold value for detecting a transition to a signal interval, it is decided that the envelope has not made a transition to a signal interval, and the third signal interval detection/decision unit 410 turns off Step 1 flag and resets the rising edge detection counter and the frame counter.

(Step 2) Detection of a Signal Interval

Figure 6:
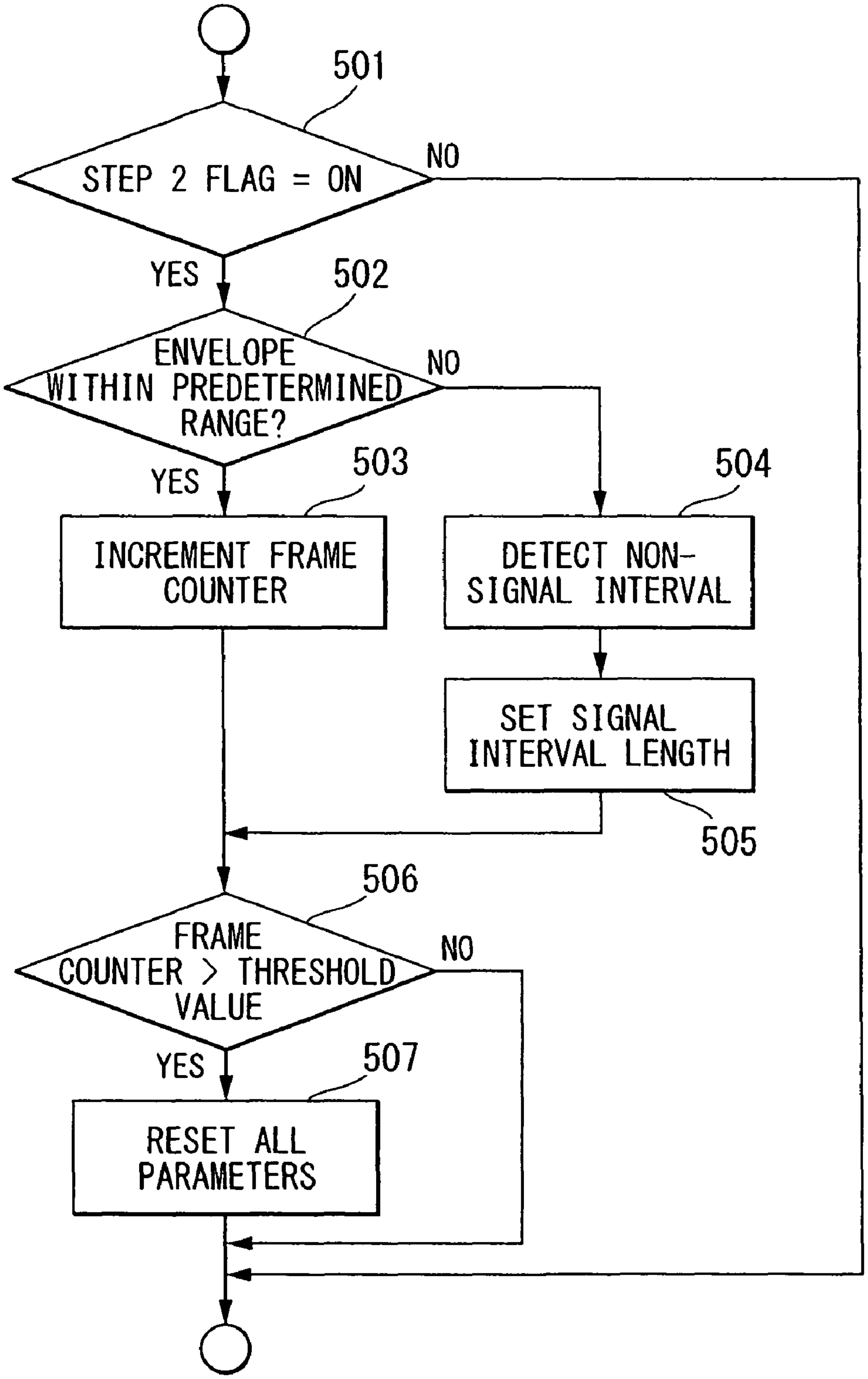
FIG. 6 is a flowchart showing operations for detecting a signal interval in the signal condition deciding section according to Embodiment 1 of the present invention.

FIG. 6 is a flowchart showing operations for detecting a signal interval. Reference numeral 501 denotes a signal condition decision unit, reference numeral 502 denotes an envelope comparator, reference numeral 503 denotes a frame counter updater, reference numeral 504 denotes a non-signal interval detection/decision unit, reference numeral 505 denotes a signal interval length setting unit, reference numeral 506 denotes a frame counter comparator, and reference numeral 507 denotes an all-parameter resetter. In the detection of a signal interval, the number of processed frames is counted where the envelope fluctuates within a predetermined range relative to the reference level having been set by the reference level setting unit 407, so that the length of a signal interval is calculated.

The signal condition decision unit 501 decides whether Step 2 flag is turned on or off. When Step 2 flag is turned on, the envelope comparator 502 compares the envelope with the predetermined range to decide whether the envelope is within the predetermined range relative to the reference level having been set by the reference level setting unit 407. When the envelope is within the predetermined range, the frame counter updater 503 increments the frame counter. When the envelope falls outside the predetermined range, it is decided that a signal interval has come to an end and the envelope has made a transition to a non-signal interval, and the non-signal interval detection/decision unit 504 turns off Step 2 flag and turns on Step 3 flag. The signal interval length setting unit 505 sets the frame counter value at that time as the latest signal interval length and resets the frame counter. The frame counter comparator 506 compares the frame counter with a predetermined threshold value. When the frame counter exceeds the threshold value, it is decided that the envelope has not made a transition to a non-signal interval, the all-parameter resetter 507 turns off Step 2 flag and Step 3 flag, resets the frame counter and the rising edge detection counter, and resets the latest and past signal interval lengths and non-signal interval lengths.

(Step 3) Detection of a Non-Signal Interval

Figure 7:
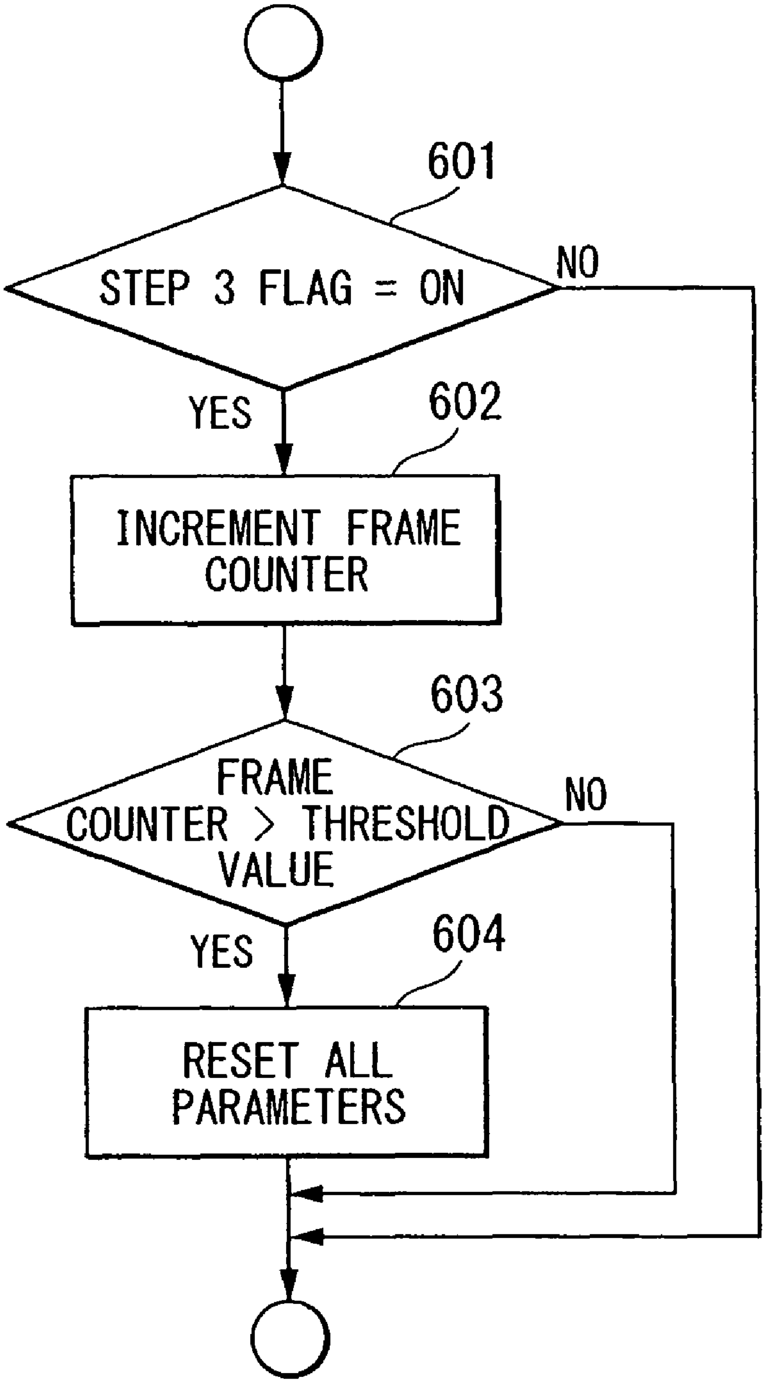
FIG. 7 is a flowchart showing operations for detecting a non-signal interval in the signal condition deciding section according to Embodiment 1 of the present invention.

FIG. 7 is a flowchart showing operations for detecting a non-signal interval. Reference numeral 601 denotes a signal condition decision unit, reference numeral 602 denotes a frame counter updater, reference numeral 603 denotes a frame counter comparator, and reference numeral 604 denotes an all-parameter resetter. In the detection of a non-signal interval, the number of processed frames is counted until the subsequent rising edge of the signal is detected with Step 3 flag being turned on.

The signal condition decision unit 601 decides whether Step 3 flag is turned on or off. When Step 3 flag is turned on, the frame counter updater 602 starts incrementing the frame counter. The frame counter comparator 603 compares the frame counter and a predetermined threshold value. When the frame counter exceeds the threshold value, the all-parameter resetter 604 turns off Step 2 flag and Step 3 flag, resets the frame counter and the rising edge detection counter, and resets the latest and past signal interval lengths and non-signal interval lengths.

Figure 8:
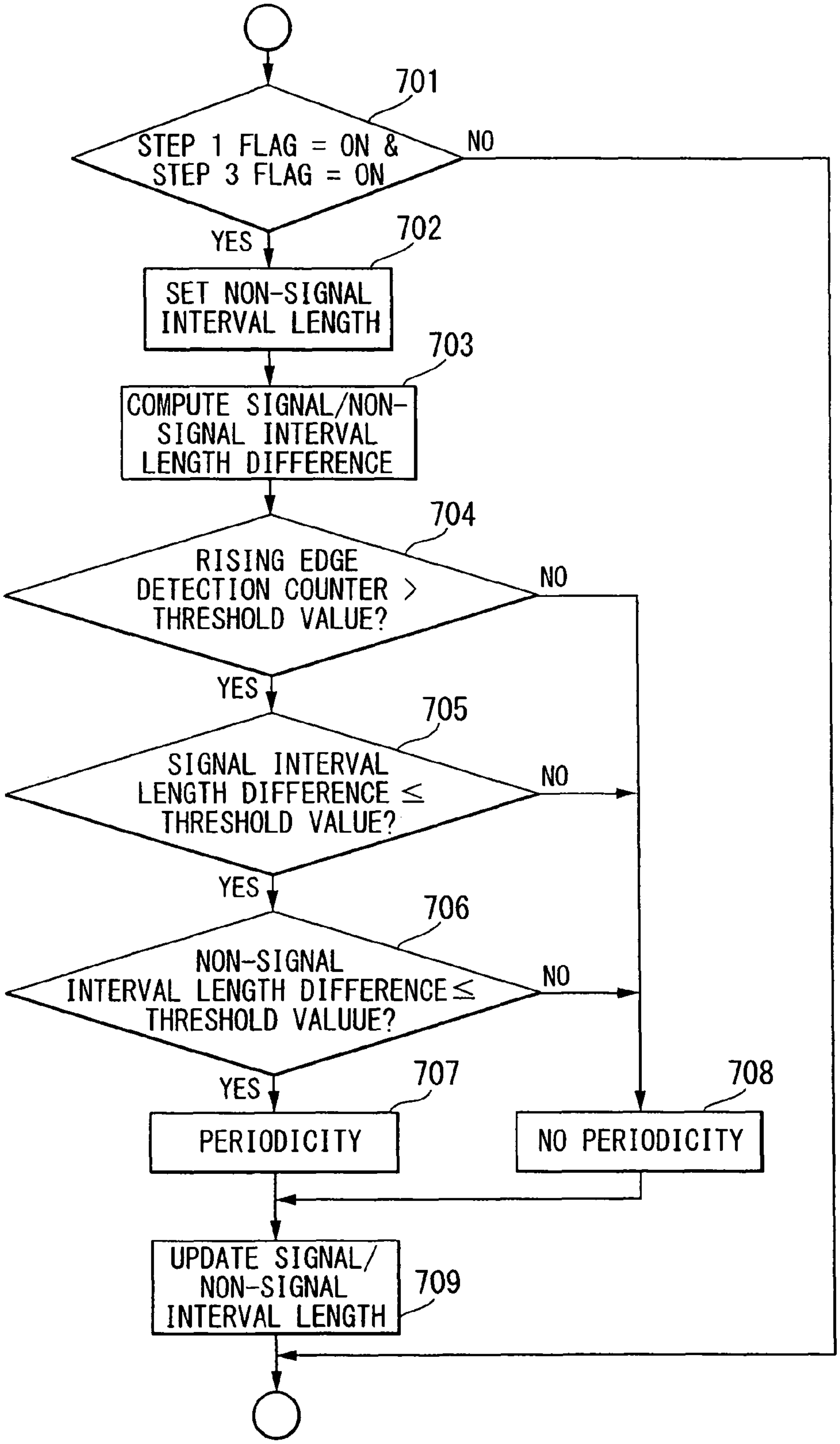
FIG. 8 is a flowchart showing the operations of a periodicity deciding section according to Embodiment 1 of the present invention.

The following will discuss the operations of the periodicity deciding section 115. FIG. 8 is a flowchart showing the operations of the periodicity deciding section. Reference numeral 701 denotes a signal condition decision unit, reference numeral 702 denotes a non-signal interval length setting unit, reference numeral 703 denotes a signal/non-signal interval length difference computing unit, reference numeral 704 denotes a rising edge detection counter comparator, reference numeral 705 denotes a signal interval length difference comparator, reference numeral 706 denotes a non-signal interval length difference comparator, reference numeral 707 denotes a first periodicity decision unit, reference numeral 708 denotes a second periodicity decision unit, and reference numeral 709 denotes a signal/non-signal interval length updater. The periodicity deciding section 115 decides whether the time progression of the level has periodicity, by using the processing result of the signal condition deciding section 114.

The signal condition decision unit 701 decides whether Step 1 flag and Step 3 flag are turned on. When Step 3 flag is turned on and Step 1 flag is turned on, the non-signal interval length setting unit 702 sets the frame counter value at that time as the latest non-signal interval length, resets the frame counter, and turns off Step 3 flag. The signal/non-signal interval length difference computing unit 703 calculates a difference in signal interval length and a difference in non-signal interval length between the latest time period and the previous time period. The rising edge detection counter comparator 704 compares the rising edge detection counter with a predetermined threshold value of the rising edge detection counter. The signal interval length difference comparator 705 compares a predetermined threshold value of a signal interval length difference with the signal interval length difference having been calculated by the signal/non-signal interval length difference computing unit 703. The non-signal interval length difference comparator 706 compares a predetermined threshold value of a non-signal interval length difference with the non-signal interval length difference having been calculated by the signal/non-signal interval length difference computing unit 703. When the rising edge detection counter exceeds the threshold value of the rising edge detection counter, the signal interval length difference is smaller than or equal to the threshold value of the signal interval length difference, and the non-signal interval length difference is smaller than or equal to the threshold value of the non-signal interval length difference, then the first periodicity decision unit 707 decides that the time progression of the level has periodicity; otherwise, the second periodicity decision unit 708 decides that the time progression of the level does not have periodicity, and outputs the decision result to the howling deciding section 107. The signal/non-signal interval length updater 709 sets the latest signal interval length and non-signal interval length as past signal interval length and non-signal interval length, so that the past signal interval length and non-signal interval length are updated.

When the howling detecting section 105 decides that howling occurs and the periodic signal detecting section 106 does not decide that the time progression of the level has periodicity, the howling deciding section 107 decides that howling occurs. After the howling detecting section 105 decides that howling occurs, when the periodic signal detecting section 106 decides that the time progression of the level has periodicity, the howling deciding section 107 decides that the detection of howling is erroneous and howling is absent. The howling decision result of the howling deciding section 107 is output to the signal output terminal 108.

As described above, the howling detector of the present embodiment decides whether a frequency level exceeds the other frequency levels, decides whether the time progression of the level at each frequency has periodicity, and discriminates between howling and a signal having a strong narrow-band component, so that erroneous detection of howling is reduced and howling can be detected with higher accuracy than the related art.

In the present embodiment, the processing of the level calculating section 104, the howling detecting section 105, the periodic signal detecting section 106, and the howling deciding section 107 is limited to some frequency bands (for example, frequency bands or the like where howling is expected to occur), so that an arithmetic quantity can be reduced.

In the present embodiment, howling is detected at respective frequencies separately and in parallel. Frequency signals having been converted by the frequency analyzing section 103 may be added in a fixed number of points to determine frequency bands and processing may be performed for the respective frequency bands separately and in parallel. Further, the time signal having been input to the frequency analyzing section 103 may be divided into time signals of two or more frequency bands by using plural FIR (Finite Impulse Response) band-pass filters or IIR (Infinite Impulse Response) band-pass filters or sub-band signal processing capable of reducing an arithmetic quantity, and the time signals of the frequency bands may be processed separately and in parallel.

The present embodiment described that the envelope calculating section 113 calculates the envelope of the time progression of the level by calculating the maximum value of the levels of the currently processed frame and the Na frames before the current frame. Instead of the maximum value, the minimum value of the levels of the currently processed frame and the Na frames before the current frame may be calculated to obtain the envelope of the time progression of the level.

In the above explanation, the signal condition deciding section 114 decides which one of the three-stage signal conditions of the rising edge of a signal, a signal interval, and a non-signal interval corresponds to the time progression of the level. At least one or more signal conditions may be decided from the rising edge of a signal, a signal interval, and a non-signal interval.

Further, in the present embodiment, the periodicity deciding section 115 compares signal interval lengths and non-signal interval lengths between the latest time period and a past time period of the time progression of the level. Only one of signal interval lengths and non-signal interval lengths may be compared to decide periodicity.

Embodiment 2

Figure 9:
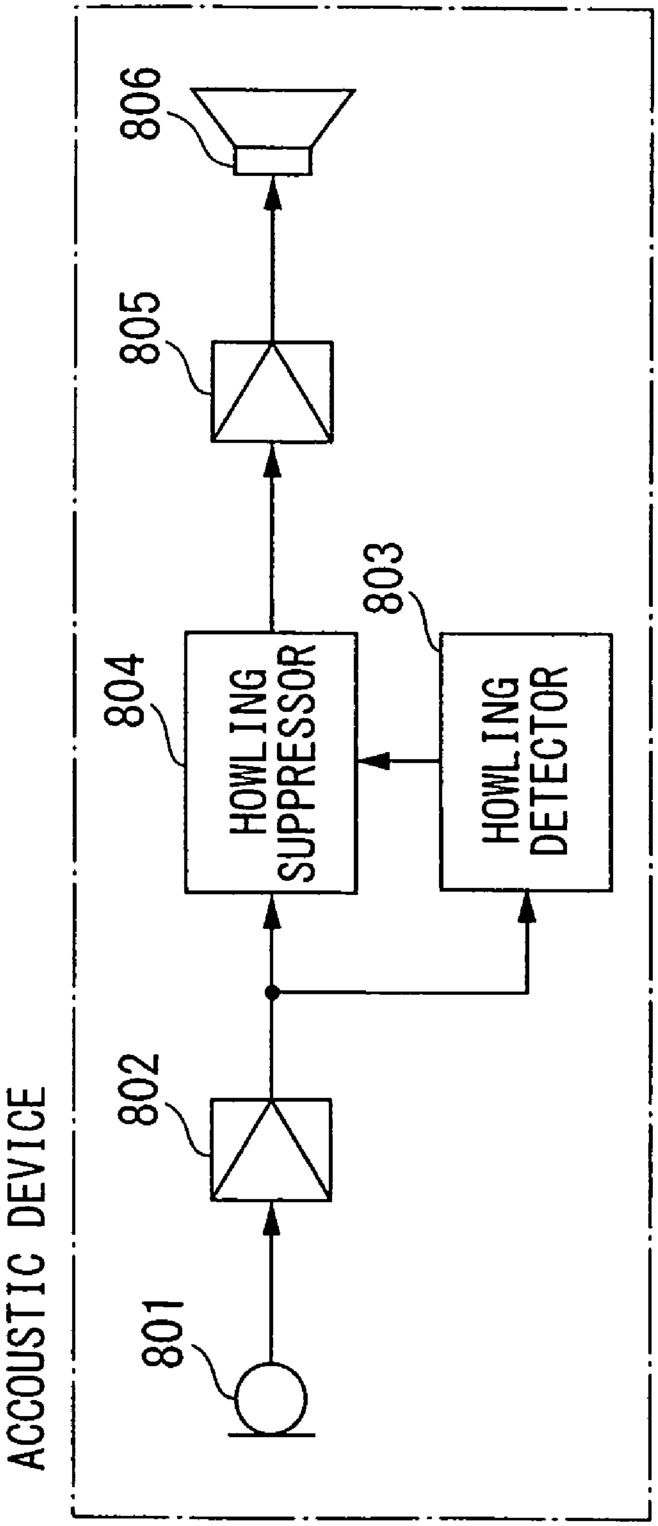
FIG. 9 is a block diagram showing the configuration of an acoustic device according to Embodiment 2 of the present invention.

The following will describe the configuration of an acoustic device according to Embodiment 2 of the present invention. In FIG. 9, the acoustic device of the present embodiment includes a microphone 801, a microphone amplifier 802 for amplifying a signal input to the microphone 801, a howling detector 803 which detects howling of a signal output from the microphone amplifier 802 and is similar to the howling detector of Embodiment 1, a howling suppressor 804 for suppressing howling based on the howling detection result of the howling detector 803, a power amplifier 805 for amplifying a signal output from the howling suppressor 804, and a speaker 806 for outputting sound based on a signal output from the power amplifier 805.

The following will describe the operations of the acoustic device according to the present embodiment. A time signal input to the microphone 801 is amplified by the microphone amplifier 802, and then the signal is input to the howling detector 803 and the howling suppressor 804. A signal output from the howling suppressor 804 is amplified by the power amplifier 805, and then the signal is output by the speaker 806.

When a sound having a gain of 1.0 or higher is input from the speaker 806 to the microphone 801 and causes howling, the howling detector 803 automatically detects howling and the howling suppressor 804 suppresses howling by reducing the gain of a frequency or a frequency band where howling has been detected. The gain is reduced by using, for example, a notch filter, a bandcut filter, or a parametric equalizer, or multiplying the gain by a multiplier of 1.0 or less. After the howling detector 803 decides that howling occurs and the howling suppressor 804 starts suppressing the howling, when the howling detector 803 decides that the time progression of the level has periodicity, the howling suppressor 804 restores the erroneously reduced gain of the corresponding frequency or frequency band.

As described above, the acoustic device of the present embodiment can detect and suppress howling with higher accuracy than the related art. Thus harsh sound can be reduced and the gain of the power amplifier 805 having been limited by howling can be increased.

Embodiment 3

Figure 10:
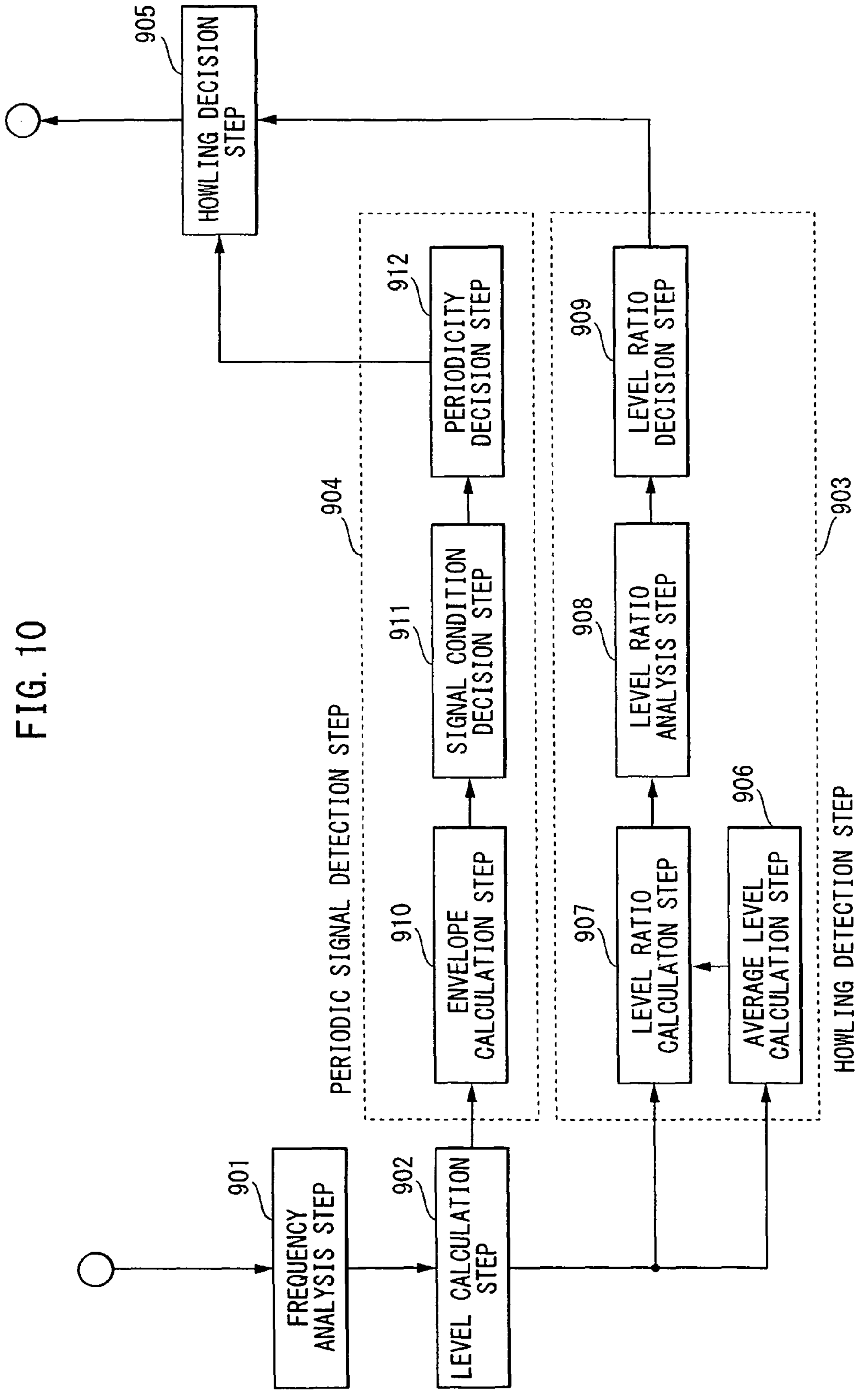
FIG. 10 is a block diagram showing the configuration of a howling detection method according to Embodiment 3 of the present invention.

The following will describe the configuration of software using a howling detection method according to Embodiment 3. In FIG. 10, the software using the howling detection method according to the present embodiment includes a frequency analysis step 901 of analyzing the frequency of a time signal, a level calculation step 902 of calculating the level of a signal output from the frequency analysis step 901, a howling detection step 903 of analyzing the level having been calculated in the level calculation step 902 and deciding whether howling occurs or not, a periodic signal detection step 904 of deciding whether or not the time progression of the level having been calculated in the level calculation step 902 has periodicity, and a howling decision step 905 of finally deciding whether howling occurs or not based on decision results from the howling detection step 903 and the periodic signal detection step 904.

The howling detection step 903 includes an average level calculation step 906 of calculating the mean value of the levels of all the frequency bands, a level ratio calculation step 907 of calculating a level ratio which is a magnification difference between the level calculated in the level calculation step 902 and an average level calculated in the average level calculation step 906, a level ratio analysis step 908 of analyzing the level ratio having been calculated in the level ratio calculation step 907, and a level ratio decision step 909 of deciding whether howling occurs or not based on the analysis result of the level ratio analysis step 908.

The periodic signal detection step 904 includes an envelope calculation step 910 of calculating the envelope of the level having been calculated in the level calculation step 902, a signal condition decision step 911 of deciding which one of predetermined signal conditions corresponds to the envelope having been calculated in the envelope calculation step 910, and a periodicity decision step 912 of deciding whether the time progression of the envelope has periodicity or not based on the decision result of the signal condition decision step 911.

The operations of the software using the howling detection method according to the present embodiment are similar to those of the howling detector of Embodiment 1, and thus the explanation thereof is omitted.

As described above, the software using the howling detection method according to the present embodiment decides whether a frequency level exceeds the other frequency levels, decides whether the time progression of the level has periodicity at each frequency of an input signal, and discriminates between howling and a signal having a strong narrow-band component, so that erroneous detection of howling is reduced and howling can be detected with higher accuracy than the related art.

Having described the present invention based on the preferred embodiments shown in the accompanying drawings, it will be obvious to those skilled in the art that various changes and modifications may be readily made without departing from the concept of the present invention. The present invention includes such modifications.

With the howling detector and the howling detection method according to the present invention, it is possible to reduce erroneous detection of howling by discriminating between howling and a signal having a strong narrow-band component, and detect howling with higher accuracy than the related art. Thus the howling detector and the method are applicable to various acoustic devices including microphones and speakers.

What is claimed is:

1. A howling detector, comprising:

a frequency analyzing section for dividing a time signal into a plurality of frequency band signals;

a level calculating section for calculating a level of each of the plurality of frequency band signals output from the frequency analyzing section over a time period defining a time progression;

a howling detecting section for analyzing the level calculated by the level calculating section and outputting a howling detection signal indicating whether howling is detected or not;

a periodic signal detecting section for analyzing the time progression of the level calculated by the level calculating section and outputting a periodic detection signal indicating whether or not the time progression of the level calculated by the level calculating section have periodicity; and a howling deciding section for receiving the howling detection signal and the periodic detection signal, wherein the howling deciding section decides that howling occurs when the howling detection signal indicates howling is detected and the periodic detection signal indicates that the time progression of the level calculated by the level calculating section does not have periodicity.

2. The howling detector according to claim 1, wherein the howling detecting section includes:

an average level calculating section for calculating a mean value of levels of all frequency bands;

a level ratio calculating section for calculating a level ratio which is a magnification difference between the level calculated by the level calculating section and an average level calculated by the average level calculating section;

a level ratio analyzing section for analyzing the level ratio calculated by the level ratio calculating section; and a level ratio deciding section for deciding whether howling occurs or not based on an analysis result of the level ratio analyzing section.

3. The howling detector according to claim 1, wherein the periodic signal detecting section includes:

an envelope calculating section for calculating an envelope of the time progression of the level calculated by the level calculating section;

a signal condition deciding section for deciding which one of predetermined signal conditions corresponds to the envelope calculated by the envelope calculating section; and a periodicity deciding section for deciding, based on a decision result of the signal deciding section, whether time progression of the envelope has periodicity or not.

4. The howling detector according to claim 3, wherein the signal condition deciding section decides which at least one or more signal conditions of a rising edge of a signal, a signal interval, and a non-signal interval correspond to the envelope calculated by the envelope calculating section.

5. The howling detector according to claim 3, wherein the periodicity deciding section compares at least one or more of signal interval lengths and non-signal interval lengths between a latest time period and a past time period in the envelope calculated by the envelope calculating section.

6. The howling detector according to claim 3, wherein the level calculating section, the howling detecting section, the periodic signal detecting section, and the howling deciding section perform processing only on some frequency bands.

7. An acoustic device comprising the howling detector according to claim 1 and a howling suppressor.

8. A howling detection method, comprising:

a frequency analysis step of a plurality of filters dividing a time signal into a plurality of frequency band signals;

a level calculation step of calculating a level of each of the plurality of frequency band signals output from the frequency analysis step;

a howling detection step of analyzing the level calculated in the level calculation step and outputting a howling detection signal indicating whether howling is detected or not;

a periodic signal detection step of analyzing the time progression of the level calculated by the level calculating section and outputting a periodic detection signal indicating whether or not time progression of the level calculated in the level calculation step has periodicity, and;

a howling decision step of receiving the howling detection signal and the periodic detection signal, wherein in the howling decision step, it is decided that howling occurs when the howling detection signal indicates howling is detected and the periodic detection signal indicates that the time progression of the level does not have periodicity.

* * * * *